(12) United States Patent
Evans et al.

(10) Patent No.: US 10,737,955 B2
(45) Date of Patent: Aug. 11, 2020

(54) DESALINATION SYSTEM AND METHOD

(71) Applicants: Robert B. Evans, Santa Barbara, CA (US); Susanne E. Chess, Santa Barbara, CA (US)

(72) Inventors: Robert B. Evans, Santa Barbara, CA (US); Susanne E. Chess, Santa Barbara, CA (US)

(*) Notice: Subject to any disclaimer, the term of this patent is extended or adjusted under 35 U.S.C. 154(b) by 67 days.

(21) Appl. No.: 16/100,789

(22) Filed: Aug. 10, 2018

(65) Prior Publication Data
US 2019/0047879 A1    Feb. 14, 2019

Related U.S. Application Data

(60) Provisional application No. 62/544,400, filed on Aug. 11, 2017.

(51) Int. Cl.
| | |
|---|---|
| *C02F 1/44* | (2006.01) |
| *B01D 61/10* | (2006.01) |
| *B01D 61/12* | (2006.01) |
| *B01D 61/02* | (2006.01) |
| *B01D 61/08* | (2006.01) |

(Continued)

(52) U.S. Cl.
CPC ............ *C02F 1/441* (2013.01); *B01D 61/025* (2013.01); *B01D 61/08* (2013.01); *B01D 61/10* (2013.01); *B01D 61/12* (2013.01); *B01D 2313/90* (2013.01); *B01D 2315/06* (2013.01); *B63G 8/22* (2013.01); *C02F 2103/08* (2013.01); *C02F 2201/008* (2013.01)

(58) Field of Classification Search
None
See application file for complete search history.

(56) References Cited

U.S. PATENT DOCUMENTS

| | | |
|---|---|---|
| 3,456,802 A | 7/1969 | Cole |
| 5,229,005 A | 7/1993 | Fok et al. |

(Continued)

FOREIGN PATENT DOCUMENTS

| | | |
|---|---|---|
| BR | PI1001363 A2 | 12/2011 |
| CN | 102234148 A | 11/2011 |

(Continued)

OTHER PUBLICATIONS

Machine Translation of BRPI1001363A2 to Alves (2019) (Year: 2019).*

(Continued)

*Primary Examiner* — Chester T Barry
(74) *Attorney, Agent, or Firm* — Leydig, Voit & Mayer, Ltd.

(57) ABSTRACT

A desalination system that is deployable in a body of water having a surface and a seafloor and which includes a vessel structure that is capable of travel in water, a reverse osmosis system disposed within an internal space of the vessel structure and a tank connected to the reverse osmosis system, the tank configured to receive filtered water from the reverse osmosis system. A positioning system is provided for controlling the travel of the vessel structure, and a ballast system is configured to control the buoyancy of the vessel structure. A controller is operably associated with the positioning system and the ballast system to control the position of the vessel below the surface of the body of water.

9 Claims, 10 Drawing Sheets

(51) Int. Cl.
   *B63G 8/22*     (2006.01)
   *C02F 103/08*   (2006.01)

(56) References Cited

U.S. PATENT DOCUMENTS

| | | | |
|---|---|---|---|
| 5,516,235 | A | 5/1996 | Stangroom |
| 7,547,392 | B2 * | 6/2009 | Gordon .............. B01D 61/025 |
| | | | 210/242.1 |
| 7,731,847 | B2 | 6/2010 | That |
| 2007/0039860 | A1 | 2/2007 | Krock et al. |
| 2010/0025338 | A1 | 2/2010 | Hayas et al. |
| 2010/0051546 | A1 | 3/2010 | Vuong et al. |
| 2010/0270236 | A1 | 10/2010 | Scialdone |
| 2014/0263005 | A1 | 9/2014 | Oney |
| 2014/0339169 | A1 | 11/2014 | Zeren et al. |

FOREIGN PATENT DOCUMENTS

| | | |
|---|---|---|
| DE | 102007019347 B3 | 8/2008 |
| ES | 2 130 981 A1 | 7/1999 |
| FR | 2 484 391 A1 | 12/1981 |
| GB | 1 141 138 A | 1/1969 |
| JP | S55-073387 A | 6/1980 |
| WO | WO 2012/131621 A2 | 10/2012 |

OTHER PUBLICATIONS

Simanek, Donald "The Reverse Osmosis Problem," https://www.lockhaven.edu/~dsimanek/museum/osmosis.htm (2004).
Talley, Lynne D., "Salinity Patterns in the Ocean," in *Encyclopedia of Global Enviornmental Change*, Chichester, U.K.: John Wiley & Sons, Ltd. (2002).
International Patent Application No. PCT/US2018/045960, Search Report (dated Oct. 12, 2018).

* cited by examiner

DESALINATION SYSTEM AND METHOD

CROSS-REFERENCE TO RELATED APPLICATIONS

This patent application claims the benefit of U.S. Provisional Patent Application No. 62/544,400, filed Aug. 11, 2017, which is incorporated in its entirety herein by this reference.

TECHNICAL FIELD

The present disclosure relates to water filtering. The present disclosure also relates to buoyancy control and methods and systems related to the transport, deployment, and recovery of water filtering systems.

BACKGROUND

The conversion of sea water to fresh water is presently performed by distillation or reverse osmosis processes. These processes are expensive at least because they require large amounts of energy to heat water for distillation or to pump water through membranes. Attempts have been made to use naturally occurring forces to augment at least part of these processes and to offset the cost of operating such systems. While the use of alternative energy sources to reduce the cost of the process of generating and delivering fresh water is a promising endeavor, current processes of generating and delivering fresh water to market are still expensive.

SUMMARY OF THE DISCLOSURE

One aspect of the disclosure is a system to convert salt water or contaminated water from a water source to fresh water, wherein the system operates below the surface of the water source. The system uses the relative density between ambient contaminated or salt water and generated fresh water as ballast and for buoyancy control during positioning of the system, i.e., the descent, and operation thereof, and also the recovery to the surface of at least the generated fresh water in one embodiment, and the entire system and generated fresh water in another embodiment. Another aspect of the disclosure includes methods for integral mineralization of the fresh water to provide potable water or water that is mineralized or otherwise chemically treated for industrial or medical purposes, or pre-flavored for specialized purposes.

The systems of the present disclosure may be operated at depths below osmotic pressure and below planktonic soup. The systems of the present disclosure may be operated with an umbilical attached to a deep water structure, such as an offshore oil rig. The systems of the present disclosure may be operated with an umbilical connected to a land base operation or to a service vessel operated at the surface. The systems of the present disclosure may be operated with an umbilical attached to a deep water structure, a service ship, or a land base with fresh water extracted into bladders. The systems of the present disclosure may be provided with a source of high pressure air and with a valve and umbilical leading to ballast tanks. Air from a fresh water tank can be released into the ballast tanks to slow system descent during deployment. Air can also be released from a fresh water tank into a bladder to prime it for receiving fresh water.

In another aspect, the present systems and methods can be used to lift or lower objects from and to the bottom of a body of salt water by use of the controlled ascent or descent of an osmotic module that produces fresh water in a controlled fashion. In one embodiment, the buoyancy of the fresh water produced and collected in a bladder, relative to the surrounding salt water, can provide a lifting force for raising objects from the bottom of the sea in a controlled fashion. This method of lifting is considerably more controllable and reliable than using air filled bladders insofar as the lifting provided by the fresh water, which is incompressible, is more constant during ascent. Similarly, the release or withdrawal of fresh water can be used to gently lower objects to the sea bottom without the use of complicated and expensive cranes.

In one contemplated embodiment, the systems and methods described herein utilize an osmotic module or device that is placed below the diel or diurnal vertical migration depth of organisms living in sea or fresh water bodies. In this way, various pre-filtering stages upstream of the osmotic module, and the related pressure drop and energy consumption and complexity associated with those systems, can be omitted, which enhances the energy savings of the system as compared to surface-operated systems.

Further and alternative aspects and features of the disclosed principles will be appreciated from the following detailed description and the accompanying drawings. As will be appreciated, the principles related to water filtering, and the transport, deployment and recovery of water filtering systems disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

DETAILED DESCRIPTION

Figure 1:
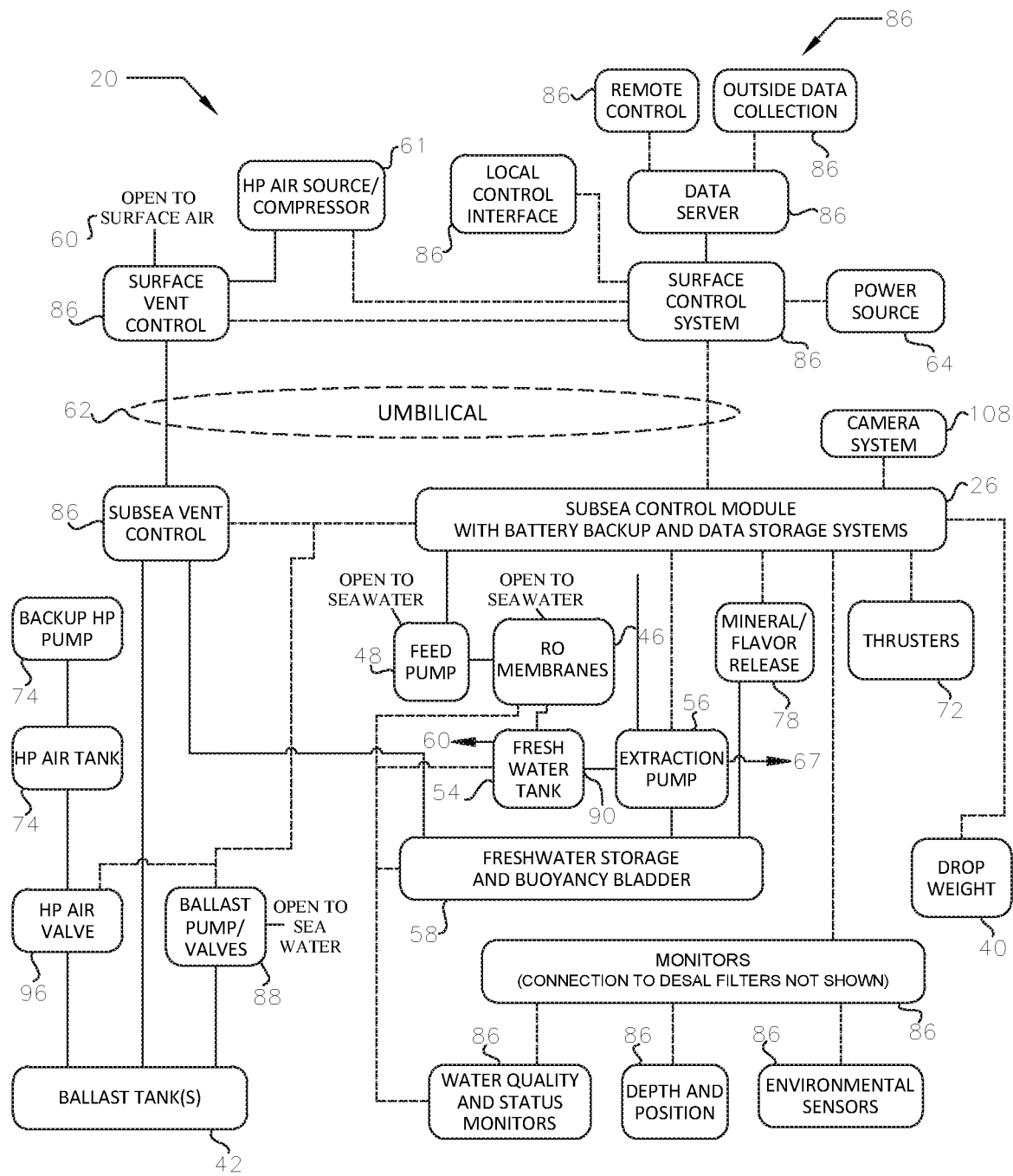
FIG. 1 is a functional diagram of a filtering system according to one embodiment of the disclosure.
Figure 2:
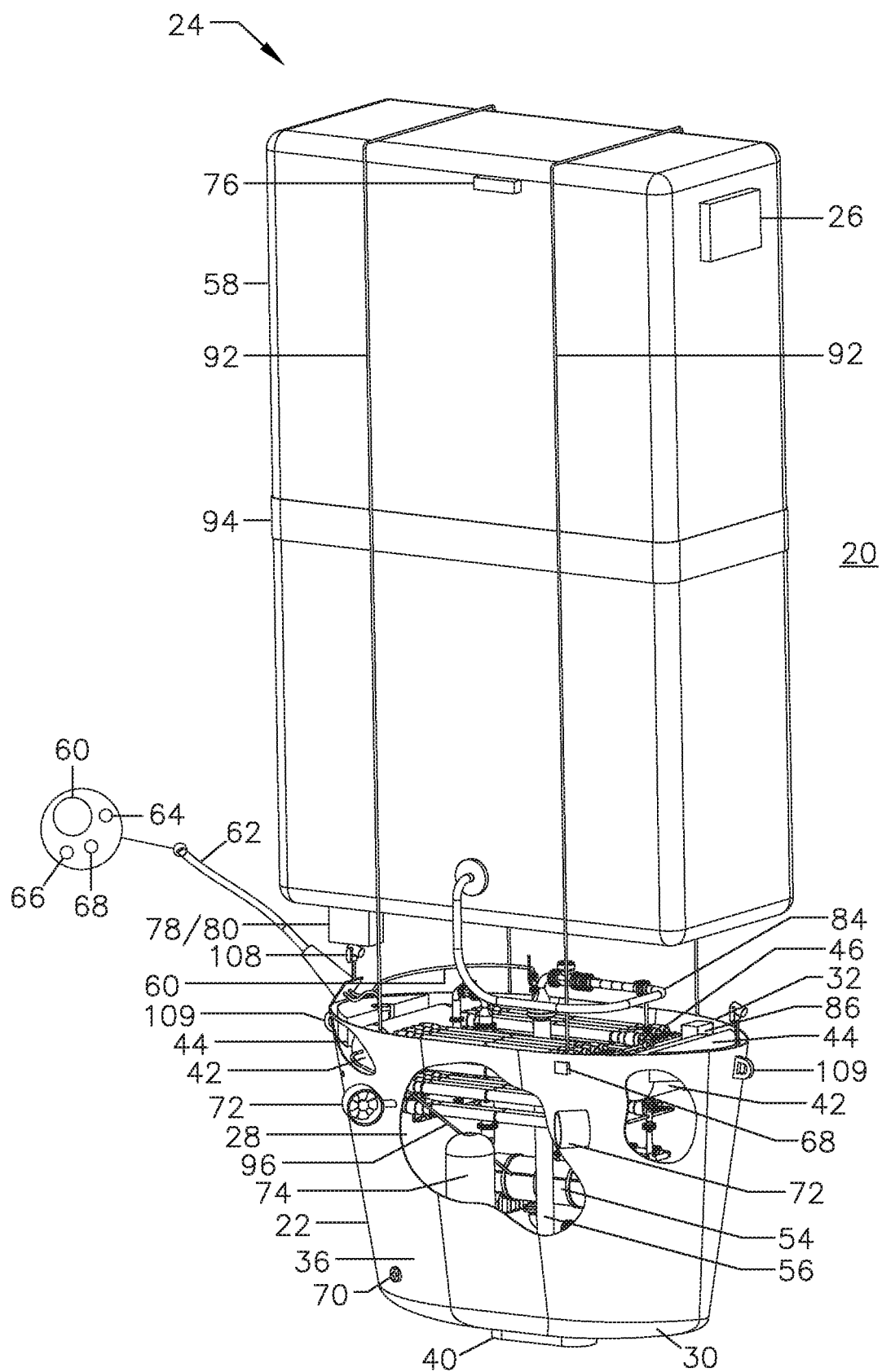
FIG. 2 is a perspective, cut-away side view of a filtering system according to another embodiment of the disclosure.
Figure 3:
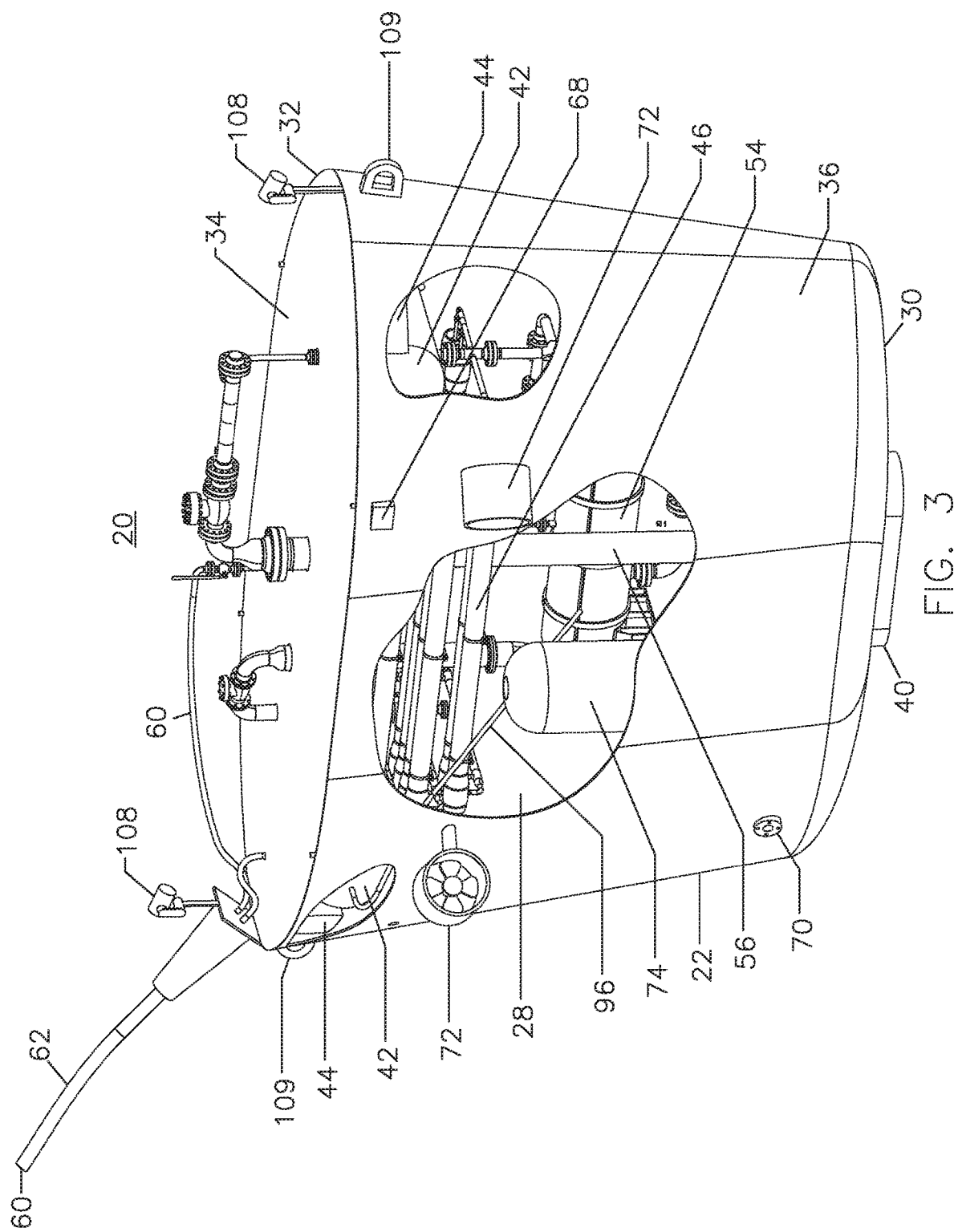
FIG. 3 is a perspective, partial cut-away side view of a filtering system according to yet another embodiment of the disclosure.

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims. The terms configured and configuration may be used herein to refer to a specified structural size and shape.

Referring to the embodiments illustrated in FIGS. 1-5, the filter system 20 includes a vessel 22. The system 20 includes a reverse osmosis system 24, for example a reverse osmosis unit, with well-known filter elements, and additionally conduits, intakes, outlets, pumps, valves, controls and the like for the operation thereof. It will be understood that any suitable configuration of the elements of a reverse osmosis system is contemplated.

The reverse osmosis system 24 may be contained within or otherwise attached to the vessel 22. The system 20 includes a positioning system 26, housed within, attached to or otherwise operationally associated with vessel 22 to perform one or more of positioning, transporting, deploying, and retrieval of the system 20. Other subsystems for operating the system 20 will be mentioned and/or detailed herein that enable and/or support water filtering, positioning, and other operations of the system. It will be understood that all elements of the system 20 are constructed to operate within and withstand the high pressure environment of deep water operations.

The vessel 22 may be the size and shape of a hull and may constitute a housing or container that is towable behind a service ship. Alternatively, the vessel 22 may be constructed as a framework 122 (FIG. 4), or include a framework, that is transported on or within a service ship or towed by a service ship to a site of operation and launched or deployed from the ship by crane or any suitable method. The vessel 22 may be fully or partially enclosed and provided with suitable input and outlet features as necessary for the operation thereof. The vessel 22 may be made of metal, plastics, composite materials, or any material or combination of materials suitable for housing, supporting, and protecting the structural elements of the filter system 20 in view of the operating environment and operational requirements thereof, and may be constructed of tubing, plates, bulkheads, panels, combinations thereof, and other conventional structural elements.

In one embodiment, the vessel 22 is shaped as a hull of a boat or ship, and may be of a specified displacement to provide a stable, towable configuration to enclose or support the reverse osmosis system 24, positioning system 26 and other elements. To that end, the hull-shaped vessel 22 may include an inner chamber or interior 28, a bottom 30, a top edge 32, a deck or top enclosure 34, and outer sides 36 to form a barge or ship-like configuration and may include attachment points 109 for towing or other attachment purposes. The vessel 22 may include a keel 40, which may be weighted to provide ballast to the vessel 22 and stability while the vessel is moving or being moved through the water or on the surface of the water. In one embodiment, the keel 40 may be a weighted structure that is selectively and releasably attached to the vessel 22 such that it can be released for an emergency resurfacing of the submerged vessel 22. The vessel 22 may include a seacock/valve 70 for flooding the interior 28 or permitting drainage of water from within the interior. The vessel 22 may include thrusters 72 or the like for assisting the positioning of the vessel 22 and other movement operations. The vessel 22 may include one or more cameras 108 for assessing the state of the system 20 visually, or guiding the positioning of the vessel 22.

To generate and collect filtered, fresh, mineralized and/or chemically treated water, a reverse osmosis system 24 may be disposed within the inner chamber 28 of the vessel 22. The reverse osmosis system 24 includes elements commonly found in such water treatment systems. For example, the system 24 may include a set of pre-osmotic filters (not shown), although in a preferred embodiment such pre-filters are omitted for systems operating in depths where such filters are not required. When used, the pre-filters may operate to filter out biological material, inert materials like sand or silt, and relatively large particulate matter. The system further includes a set of semi-permeable membranes 46 configured to permit only the passage of water therethrough while excluding all other substances.

The reverse osmosis system 24 includes a bank of such membranes 46 disposed within membrane housings in the conventional fashion. A hydraulic pressure difference between water at depth and surface pressure, as will be described hereafter, creates a pressure difference that urges water to pass through the membranes for filtering. A filter flush pump 48 may operate to, at times, backflush the membranes for cleaning or keep the membranes moist when not in use to preserve the integrity of the membranes. An inlet 50 (FIG. 4) is configured to be in communication with the feed pump 48 to draw water from the surroundings and to supply the water to the membranes 46 at least through operation of the pump. Outlet 52 is configured to receive filtered, fresh water from an extraction pump 56, which itself is configured to receive filtered, fresh water from the membranes 46. A manifold (not shown) may be arranged between the membranes 46 and the extraction pump 56 to collect fresh water from the membranes and to convey the collected water to the extraction pump. It will be understood that the reverse osmosis system 24 includes any necessary additional conventional elements and systems as are well known and customary to the operation of a reverse osmosis system to convert salt water to fresh water, such as pipes, valves, sensors, fittings, controls, and so on, at least some of which are in communication with or may be considered part of control system 86.

Figure 4:
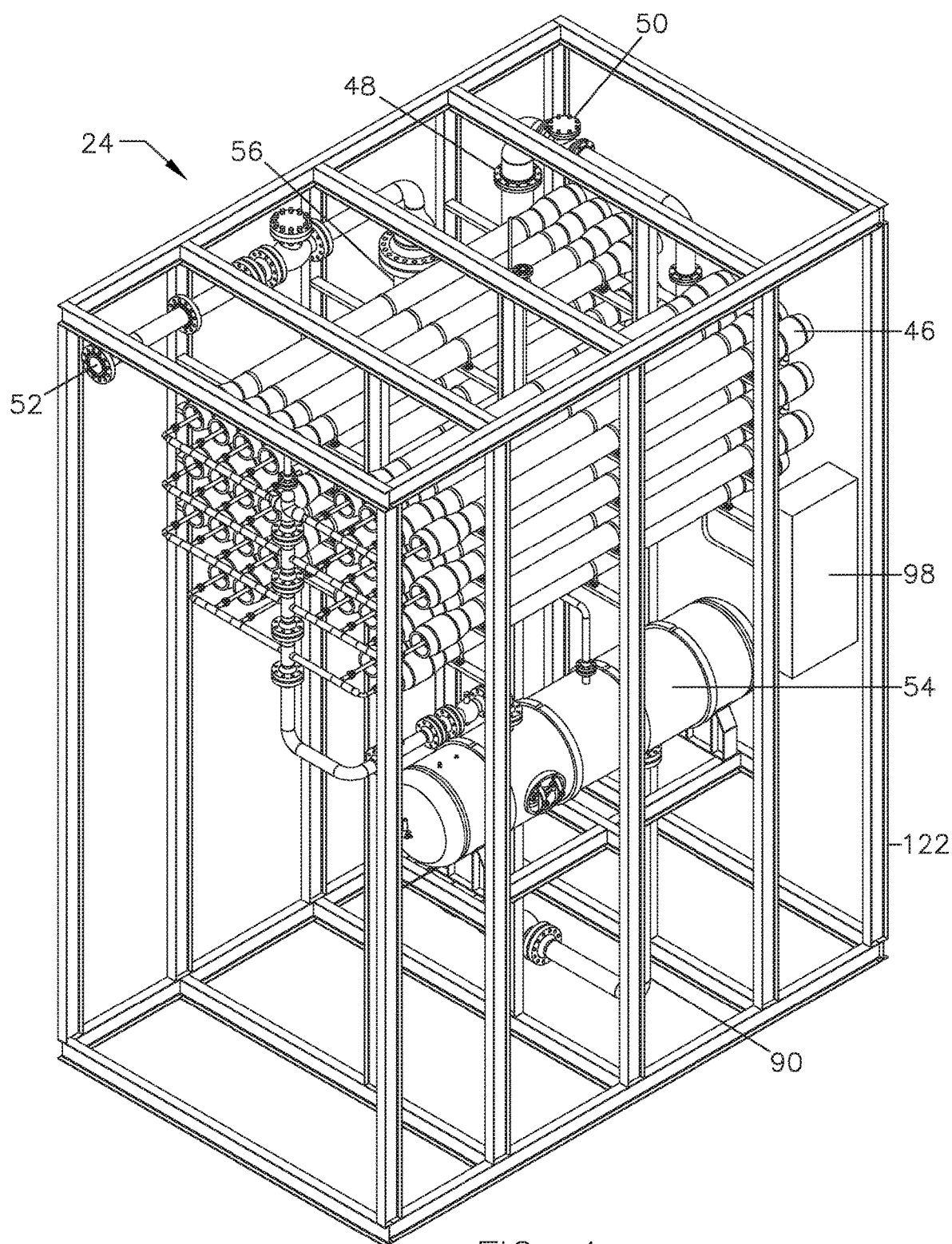
FIG. 4 is a perspective view of one embodiment of a reverse osmosis system disposed within a framework.

The output of the reverse osmosis system 24 from the outlet 52 may be plumbed to a fresh water tank 54. The fresh water tank 54 may provide a holding container of fresh water, and may be provided with a drain 90 (FIG. 4). The extraction pump 56 may also move fresh water into a bladder 58 or other suitable container. Alternatively, the extraction pump 56 may direct fresh water to the surface via a conduit 67 routed through umbilical 62.

The bladder 58 may also be in communication with one or more auxiliary air supply tanks 74. The bladder 58 may have a release valve 76 for emergency purging of the contents thereof or for other functions. The bladder 58 may be the primary collector of fresh water from the extraction process of the membranes 46, it may be utilized to control buoyancy of the system 20 for positioning the system at a desired depth and/or pressure, and may also be utilized to aid in retrieval of the system when the collection of fresh water provides sufficient buoyant lift based on the difference of density of fresh water relative to the salt water displaced by the water contained in the bladder 58. In one embodiment, more than one bladder 58 can be used in tandem to prolong the service life of the deployed system, increase system yield, adjust the amount of water extracted from the system at any time and the like. Installation of additional bladders 58 can be accomplished by incorporating dedicated shutoff valves on each bladder and connecting their inlets in parallel water circuit connection to the outlet of the pump 56.

Minerals or chemicals may be pre-inserted in the bladder 58, or the bladder may be constructed with an external mineral or chemical pack 78 and port 80. The port 80 opens to infuse the bladder in response to the pack 78 being pressurized by the increase in ambient pressure during descent of the vessel 22 to a desired, specified depth of operation.

In the alternative, the chemical pack 78 may be provided with a powered mechanism, such as a pump 82 (FIG. 5), that actively dispenses contents stored in a pack 78 or the like into the bladder 58. The pump 82 may be disposed along the fresh water input 84 of the bladder. The pump 82 can include a piston/cylinder mechanism activated by a sensed increase in ambient pressure or from a signal generated by a sensor or a signal from a controller or control system 86.

A tube, conduit, or pipe snorkel 60 connects the fresh water tank 54 to open air at the surface of the body of water, which may include a connection to a service ship, a permanent platform, a buoy, or a land-based station, for example. In this respect, an auxiliary high pressure air source or compressor 61 may be selectively connectable to the snorkel 60. The conduit 60 is used to maintain the fresh water tank at or near surface pressure in order to create the pressure differential necessary for the reverse osmosis process to occur between surface pressure and water pressure at the depth at which the device is placed for service.

The extraction pump 56 extracts water from the fresh water tank 54 and increases the fresh water pressure sufficiently to raise the water from the fresh water tank to the surface of the body of water, where the fresh water is collected. The pressure increase of the fresh water in this fashion will depend on the operating depth of the system 20. The pump 56 may extract fresh water to the surface through an umbilical 62, to a pipe, or directly to the surface as detailed herein.

The vessel 22 may include one or more ballast structures, tanks, or packs 42, 44 or the like. The ballast tanks 42 may be air tanks, while ballast 44 may be a structure that is made from a buoyant material, e.g., synthetic foam, micro glass sphere filled floatation high density block and the like. The ballast 42, 44 will be disposed on or in the vessel 22, and may be distributed to maintain a desired orientation of the vessel in a conventional fashion. The ballast 42, 44 may include natural or synthetic materials, like metal elements, fluids, or gases and tanks or other enclosures to contain the materials.

In one embodiment, the system 20, vessel 22 and associated systems and/or components are assembled with weight distributed in a configuration to maintain stability during descent, ascent, operation and recovery, for example with heaviest components, keel 40, fresh water tank 54, and extraction pump 56 disposed at or near bottom center of the vessel. Ballast, synthetic foam or buoyancy packs 44, ballast tanks 42, and bladder 58 may be located near, in, or at an upper portion of the vessel 22, on or near the top edge 32 or upper deck 34 to provide the desired orientation and optionally a self-righting feature, should the vessel 22 be upset or overturned during transport or other operations. The ballast tanks 44 may be provided or maintained with air or water by ballast tank pumps 88 (FIG. 5) to provide a means of controlling the buoyancy of the system 20.

In one embodiment, the system 20 may be tethered to the surface by umbilical 62 for providing one or more of air 60, electrical power 64, wired and/or optical data conduits, or other communication conduits 66 between elements of the system 20, and between the system and surface operations to control operations and for safety and emergency response, for example, in case of a malfunction of the system 68. The umbilical 62 may also carry fresh water 67 from the reverse osmosis system 24 to the surface.

The umbilical 62 may carry information, for example in the form of signals, for control system 86, which may be located at the surface on the service ship, a land-based facility, a buoy, or alternatively the control system 86 may be, at least in part, disposed in or on the vessel 22. Also, the control system 86 may be distributed with control subsystems located in many locations, depending on the function of the control subsystems for efficiency, operator manipulation and monitoring, reporting functions and serviceability, for example.

The control system and any control sub-system modules 86 of this disclosure may be of any conventional design having hardware and software configured to perform the calculations and send and receive appropriate signals to perform the operations of the filtering system 20. The control system may include one or more controller sub-units, and may be configured solely to perform the filtering operation, or to perform the positioning and other processes of the filtering system 20. The controller 86 may be of any suitable construction, however in one example it comprises a digital processor system including a microprocessor circuit having data inputs and control outputs, operating in accordance with computer-readable instructions stored on a computer-readable medium. Typically, the processor will have associated therewith long-term (non-volatile) memory for storing the program instructions, as well as short-term (volatile) memory for storing operands and results during (or resulting from) processing.

In an alternative embodiment, the system 20 may be disposed within a framework 122 (FIG. 4), or components of the system can be integrated with other systems or components that operate at depths and generate fresh water as a product or by-product. For example, the system 20 may be annexed to subsea separators employed for subsea separation of oil, gas, and water, and the water is routed into a bladder for storage and/or recovery of fresh water, or employed to provide buoyancy for a subsea module or to raise system components to the surface.

Figure 5:
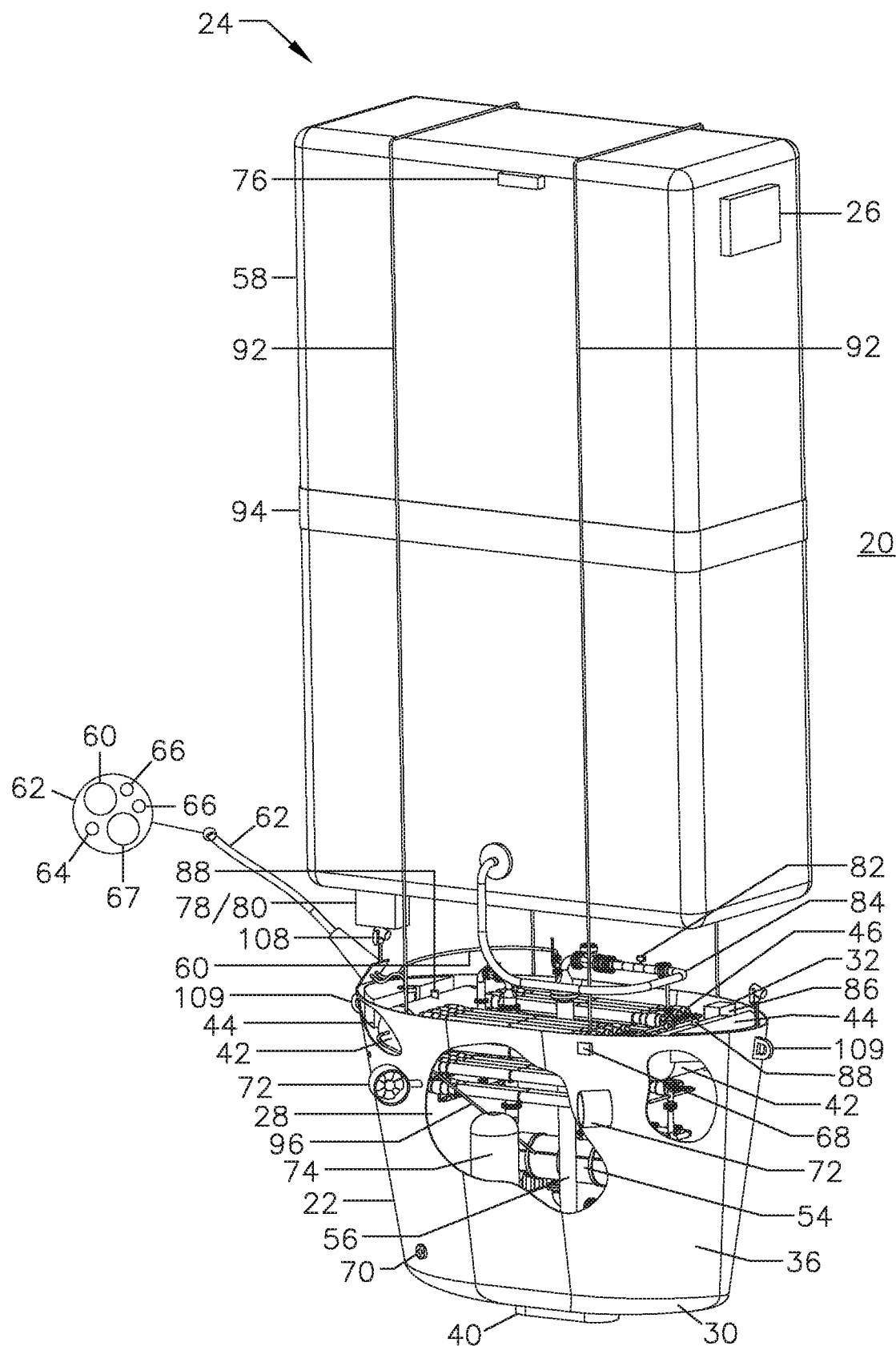
FIG. 5 is a perspective, cut-away side view of a filtering system according to yet another embodiment of the disclosure.

In the embodiment of FIG. 5, one or more bladder(s) 58 (one shown may be attached to the vessel 22 by cables, straps, lines 92 or the like. The straps 92 may be permanent or releasable. The straps 92 may be utilized to restrain the bladder 58 in a undeployed state and configured to release the bladder 58 automatically in response to the detection of a predetermined condition, for example, when the bladder 58 is sensed to be full of fresh water for retrieval thereof, or when the vessel 22 reaches a specified depth. In the alternative, the straps 92 may release the bladder from the vessel remotely by an operator or by a release mechanism (not shown) operated by the control system 86. In one embodiment, the bladder 58 is supported by a bladder structure 94 in the configuration of a collar, for example.

In operation, and referring to FIGS. 6A-D and 7, the bladder 58 may be initially formed into a rolled, folded or otherwise compacted state and secured to the deck 34 or the top of a framework type vessel structure 22 during transport, launching, and subsequent descent to a specified operating depth 100. The bladder 58 may be rolled, as shown in FIGS.

Figure 6:
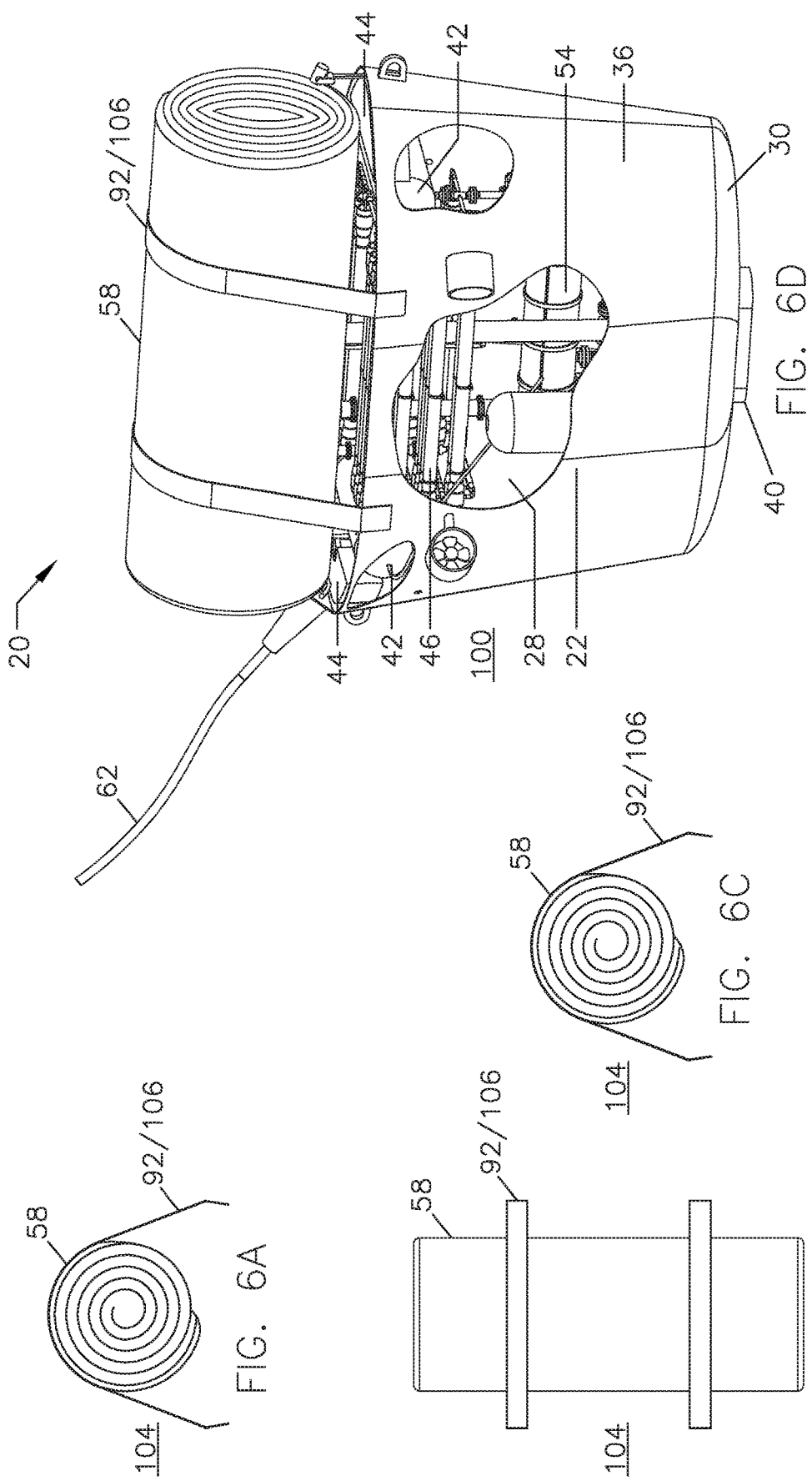
FIG. 6A-D are, respectively, a first side view, a top view, a second side view, and a perspective view of the filtering system of FIG. 3 with an undeployed bladder.
Figure 7:
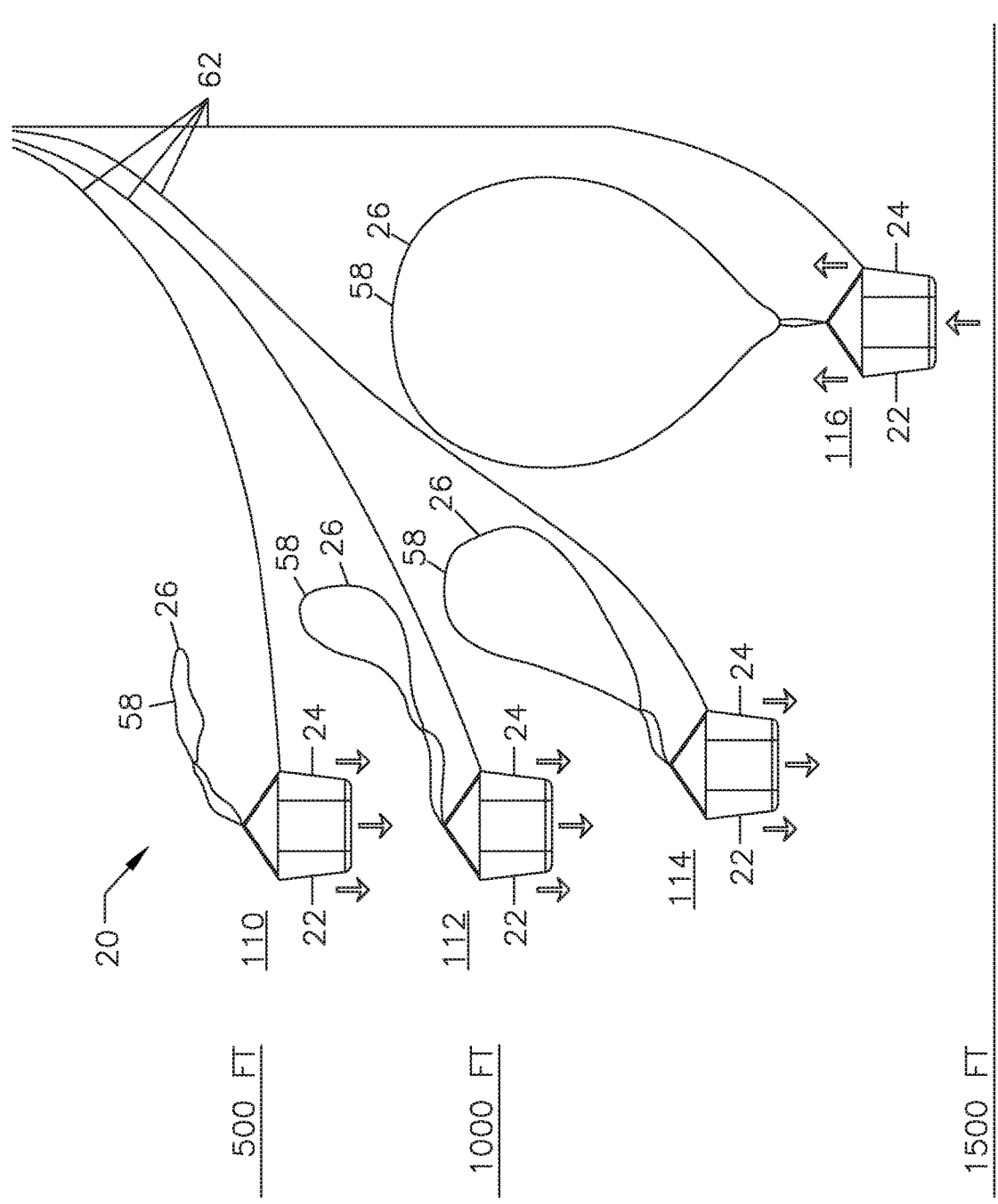
FIG. 7 is the system of FIG. 6 illustrating a method of system positioning and retrieval and different states of deployment of the bladder.
Figure 8A:
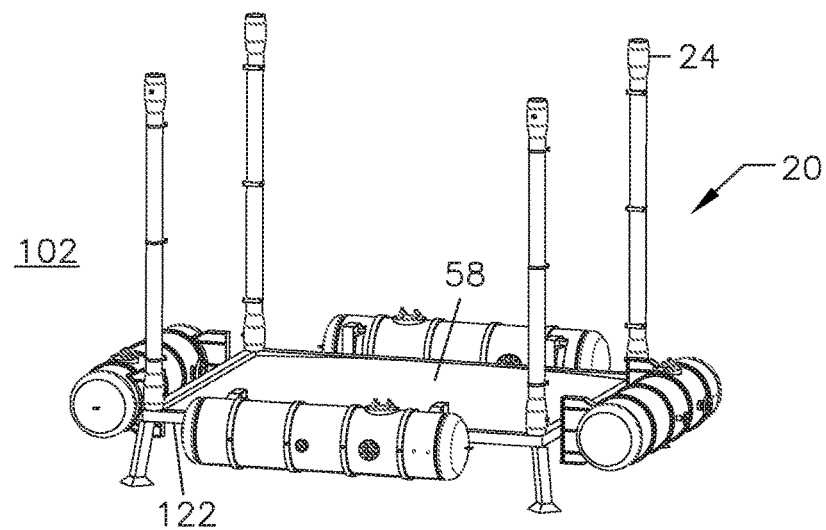
FIG. 8A-C is perspective views of yet another embodiment of a filtering system of the disclosure.
Figure 8B:
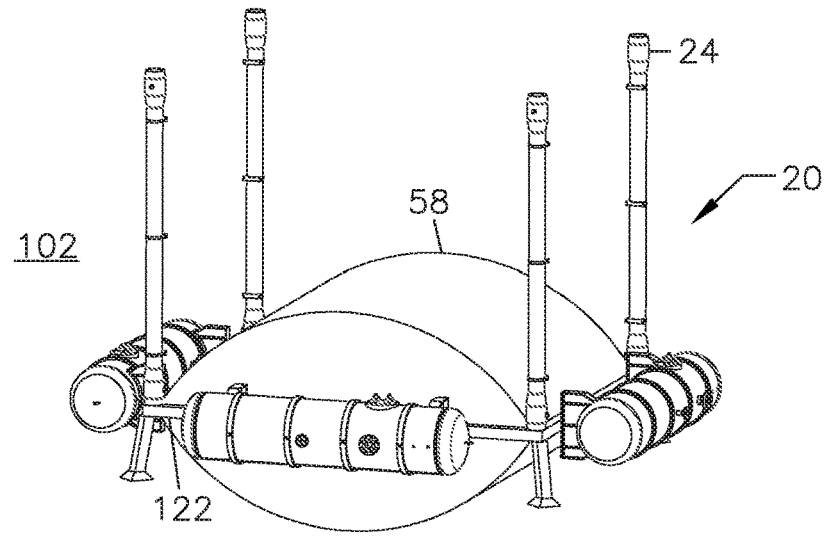
Figure 8C:
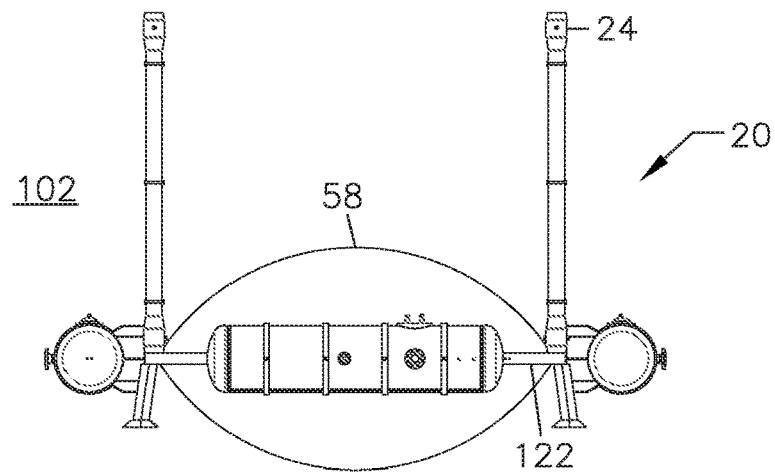
Figure 9:
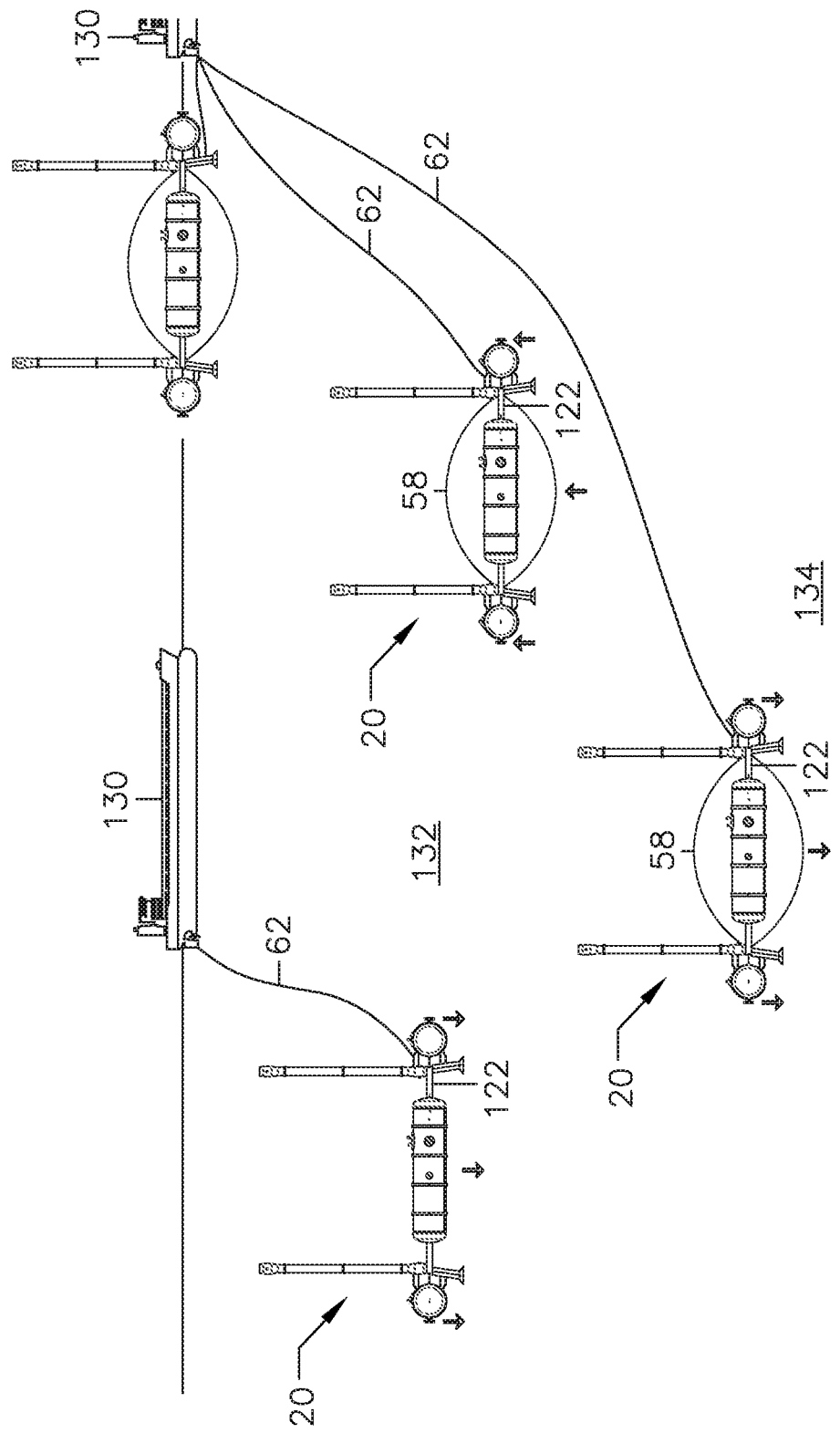
FIG. 9 is one embodiment of a method of positioning the system of FIGS. 8A-C.

6 A-D and held in place by a flexible clamp or clamps or the like, which are released after the system 20 is permitted to drop below the surface of the water, or released before or when the system reaches a specified depth. In FIG. 7, the system 20 may be dropped and air may be purged from ballast tanks 74 to permit the system to descend 110. At or below operational depth, the bladder 58 is released from the rolled or furled state 104 (FIG. 6D). When the system 20 starts to generate fresh water, the bladder 58 begins to collect the water and inflate 112. At some point in time, for example, when the system has descended to a specified or predefined depth, the system 20 approaches positional equilibrium, wherein the bladder 58 is semi or fully inflated with fresh water 114. The control system 86 fills or purges the various ballast tanks 42 to maintain the system 20 at the specified depth. The specified depth may advantageously be below the diel vertical migration depth for sea life, e.g., below 900 ft. from the surface. At a subsequent point in time, for example when the bladder 58 is full or after a predefined operation period, the system 20 is permitted to return to the surface for harvesting fresh water collected in the bladder, or for servicing. Ascent of the system can be assisted by the buoyancy of the fresh water 116 collected in all or fewer than all of the bladder(s) 58.

In an alternative embodiment, shown in FIGS. 8A-C and 9, the bladder 58 is disposed in an integral configuration 102 with or within the framework 122. The framework 122 includes the above detailed reverse osmosis system 24 and positioning system 26, and the system 20 is controlled by control system 86. The framework 122 also includes other necessary elements and subsystems as noted above.

The frame 122 may be configured to rest in a stable fashion on the seafloor with or without attachment thereto. Accordingly, the frame 122 may be generally rectangular or triangular in shape. The frame 122 will be sized and shaped to support the bladder 58 when full and all of the associated functional elements of the system 20 detailed above. With respect to FIG. 9, a service ship 130 may tow the framework 122 and system 20 from a shore location or other location to a desired site 132. The service ship 130 uncouples from the system 20 and the system is permitted to descend to a selected depth 134 or to the seafloor. The system 20, tethered by umbilical 62, maintains connection to a land based operation and may be retrieved by the land based operation upon generation and collection of a predetermined volume of fresh water, or for servicing, for example.

The system 20 may be towed behind a tugboat or other ocean going service vessel, or deployed from the deck of a barge, from land or an offshore structure, such as an offshore oil platform, or other surface operation vessel or structure. Once the system 20 is in the water and over a selected operating location, the seacock valve 70 is opened to flood the inner chamber 28. The entry of the water into the interior of the vessel 22 causes the system 20 to sink to a level that immerses the ballast tanks 42. The ballast pump valves 88 (FIG. 5) are opened to release air from the tanks and permit water to flood the ballast tanks 42, which causes the negatively buoyant system to sink below the surface of the water to a submerged depth below the surface of the body of water.

The descent of the system 20 towards the submerged depth may accelerate with increasing depth, and may attain terminal velocity. The fresh water tank 54 may be initially filled with high pressure air at the surface. The control system 86 can be configured with programming to open valve 96 (FIG. 5) to release air in the tank 54 into the ballast tanks 42 to stop or slow descent of the system 20. The system may alternatively deploy one or more bladders to increase drag and slow the terminal velocity of the descending structure. Air may also be released into the receiving bladder 58 to inflate the bladder into an operational position from a furled position 104, and to prime the bladder to receive fresh water. Thrusters 72 may be used to slow or control the rate of descent of the system 20 and to maintain the position of the system 20 below the surface. The system 20 may be maintained at a specified depth by regulation of the buoyancy of the system in a controlled fashion. Alternatively, or in addition, the system 20 may be attached to the sea bottom, such as by an anchor and a tether not shown, the buoyant force of the bladder locating the vessel structure a distance above the seafloor defined by the length of the tether, or by a structure that is attached to the sea bottom. In addition, the system 20 may be attached to a floating structure as is known in the oil drilling art.

Referring to at least FIGS. 1-5, generation of fresh water may commence when the control system 86 exposes the desalination devices to a pressure difference, for example, by opening the valves between the fresh water tank 54, the snorkel 60, and the reverse osmosis system 24 while beginning to operate the extraction pump 56. The access of the snorkel 60 to air at the surface maintains the fresh water tank 54 at atmospheric pressure. High pressure air may be forced down the snorkel 60 from the surface in an emergency situation to control buoyancy of the system 20. High pressure tanks and/or backup high pressure air pumps 74 may be caused to release air into the fresh water tank 54 in an emergency situation to control buoyancy or to re-establish air in the snorkel 60 if the snorkel is flooded.

The differential in pressure between the fresh water tank at or near atmospheric pressure and the reverse osmosis system open to ambient pressure urges salt water against the membrane and yields fresh water, which moves through the reverse osmosis system 24 and into the fresh water tank 54. The membrane feed pump 48 may be operated in reverse to clear the brine that is concentrated on the sea water side of membranes 46.

Alternatively, the membrane feed pump 48 may direct the brine to a brine collection bladder or container 98 (FIG. 5). The extraction pump 56 may be operated to extract water from the fresh water tank 54 and pump it into the bladder 58. As the bladder 58 fills with fresh water it may expand to accommodate the volume of fresh water being generated.

The control system 86 may be programmed to activate various operational systems at operational depth. It is noted that the operational depth may be a preselected distance from the surface or the bottom of the body of water, or may alternatively be a variable distance from the bottom, for example, in areas where tides affect the depth of the body of water. Moreover, the operational depth may change between adjustments in the buoyancy and ballast of the system, which will change during operation. The control system 86 may also be programmed to calculate the rate of descent and determine and control the acceleration of the system 20, the weight of the system, the relative flow rate and collection of water into the receiving bladder 58 to slow descent and stop at or near a depth corresponding to an optimum rate of permeation of salt water through the membranes 46, and collection of fresh water through the fresh water tank 54, extraction pump 56 and into the receiving bladder.

With respect to maintenance of the operational depth of the system, it is noted that a variable, buoyant force tending to pull the system towards the surface will increase as storage of fresh water increases in the bladder. This force may be counteracted by adjustments to the ballast of the system, and other methods, as previously described. The adjustments, which can be made autonomously by an electronic controller of the system, depend on the difference in density of salt water, recovered brine, or other contaminated water in which the system is operating, and the fresh water that is produced. For example, the density of salt water in the oceans is approximately three percent higher than the density of fresh water.

The control system 86 may adjust the input and flow of water out of the reverse osmosis system 24, the fresh water tank 54, through the extraction pump 56 and into the receiving bladder 58 or umbilical 62, and other parameters when controlling the operating depth of the system automatically. The control system 86 may further control the flow of air through the snorkel 60 or to and from the fresh water tank, back-up pressure tanks 74 or ballast 42, 58, to maintain a neutral buoyancy of the system while operating at the desired operating depth, or provide a positive or negative buoyant force to adjust the depth of the system. Control system 86 may be further configured to adjust these and other parameters to effect an emergency surfacing or scuttling of the system.

In one contemplated embodiment, the reverse osmosis system 24, may employ membranes in the form of DOW Spiral Wound Elements (model number: SW30XLE-440i), which require a feed pressure of 800 psig, and is therefore optimally operated at a depth of approximately 1,800 feet below sea level. Membrane feed pump 48 can be employed to operate at shallower depths and lower efficiency if fresh water generation is required for buoyancy control above optimal operational depth. The control system 86 may be activated at the depth that fills the bladder at a rate to slow, stop and position the system descent at 1800 feet below sea level. The control system 86 operates to maintain flow rate and to modify ballast tank buoyancy to operate at a desired, specified optimal depth. Water may be extracted by diverting water flow through the umbilical 62 to maintain operation of the system 20 for longer periods of time and for extraction of more fresh water than the weight of the system will typically allow.

Figure 10:
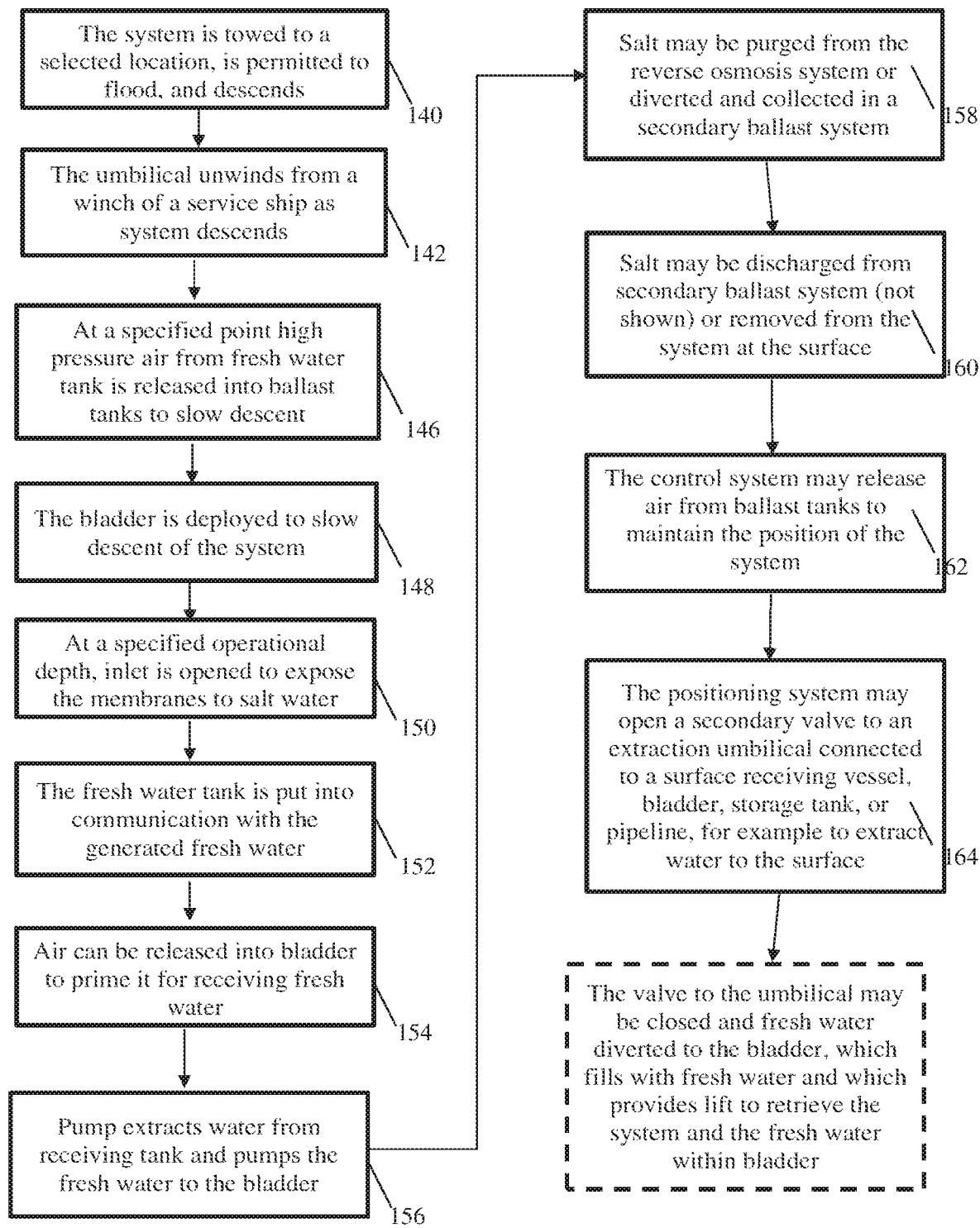
FIG. 10 is an embodiment of a method of operating a system according to embodiments of the disclosure.

One method of operating and/or positioning the system 20 is shown in FIG. 10. The system 140 is towed to a selected location. The vessel 22 or framework 122 is permitted to flood and the system 20 descends 142. The umbilical 62 unwinds from a winch on a service ship 144. At a specified point high pressure air from fresh water tank 54 is released into ballast tanks 44 to slow the descent of the system 146; bladder 58 can also be deployed for slow descent of the system 148. At a specified operational depth, inlet 50 is opened to expose the membranes 46 to salt water 150. The fresh water tank 54 is put into communication with the generated fresh water 152. Air can also be released into bladder 58 to prime it for receiving fresh water 154. Pump 56 extracts water from receiving tank 54 and pumps the fresh water to the bladder 156. Salt may be purged from the reverse osmosis system 24 and may be dispersed into the outside environment, or it can be diverted and collected in a secondary ballast system (not shown) to offset fresh water buoyancy during operation 158. Salt may be discharged from such a secondary ballast system (not shown) or removed from the system 20 at the surface 160. The control system 86 may release air from ballast tanks 42, 44 to offset fresh water buoyancy and to maintain the position of the system 162.

To maintain operational equilibrium, the positioning system 26 may open a secondary valve to an extraction umbilical connected to a surface receiving vessel. The bladder, storage tank, or pipeline, for example, can be opened and bladder valve closed to extract water to the surface 164 in instances where the buoyancy of the fresh water collected exceeds the downward force of the ballast and the vessel. In an alternative embodiment, a full bladder can be released from the vessel while an additional bladder begins to fill. The handoff between bladders may be gradual to avoid disruptions in the buoyancy of the system. In one embodiment, where a primary purpose of the system is to lift a load from the bottom of the body of water, the bladder may continue to fill such that its buoyant force exceeds the weight of the system and the load to be lifted.

At an end of a work shift, the valve to the umbilical 62 may be closed and fresh water may be diverted to the bladder 58, thus filling the bladder with fresh water, which provides lift to retrieve the system 20 and the fresh water within bladder 166. In this method, fresh water is pumped to the surface and when the system 20 is to be retrieved, the fresh water is diverted to the bladder 58, whereupon the entire system 20 is lifted to the surface due to the buoyancy of the fresh water in the bladder.

Referring to FIG. 5, a system of mineralizing or flavoring water within bladder 58 is presented. The system 20 may include a source of minerals and/or flavorings. It is well known that pure water is not necessarily desirable for drinking or other purposes and therefore it is well known to add minerals back to pure water obtained from reverse osmosis processes. Accordingly, the system 20 may include a source of minerals and/or flavorings 78, which may be in the form of a diffusion system disposed between pump 56 and bladder 58 and in fluid communication with the bladder. The diffusion system 78 may be a container containing minerals with fittings that direct fresh water from the reverse osmosis system 24, through the diffusion system, and into bladder 58. The fresh water passing through the diffusion system 78 will pick up and dissolve the minerals to provide a properly mineralized fresh water product. Alternatively, the source of minerals and/or flavorings 78 may be a water permeable bag disposed within the bladder 58 that contains minerals that in the presence of pressurized fresh water permits dispersal of the minerals into the generated fresh water. In another alternative, minerals or flavor may be introduced manually or metered into the bladder 58 before deployment of the bladder.

Various embodiments disclosed herein are to be taken in the illustrative and explanatory sense, and should in no way be construed as limiting of the present disclosure. While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

We claim:

1. A desalination system that is deployable in a body of water, the desalination system comprising:
   a vessel structure that is capable of moving along a surface of the body of water, the vessel structure defining an internal space;
   a reverse osmosis system disposed generally within the internal space of the vessel structure, the reverse osmosis system having an inlet and an outlet;
   a positioning system for controlling a travel of the vessel structure from the surface of the body of water to a submerged depth of the vessel structure below the surface of the body of water;

a water tank connected to the outlet of the reverse osmosis system, the water tank configured to receive filtered water from the reverse osmosis system;

a snorkel fluidly connecting an interior of the water tank with the surface of the body of water when the vessel structure is at the submerged depth below the surface of the body of water;

a ballast system configured to control a buoyancy of the vessel structure;

a controller operably associated with the positioning system and the ballast system, the controller selectively controlling the submerged depth of the vessel structure below the surface of the body of water;

a pump connected to the water tank and associated with the controller, the pump operable to selectively draw a portion of the filtered water from the water tank; and a bladder fluidly connected to an outlet of the pump, wherein the bladder operates to collect and store the portion of the filtered water provided by the pump.

2. The desalination system of claim 1, further comprising a brine container connected to the reverse osmosis system, wherein the reverse osmosis system is configured to direct brine from the reverse osmosis system to the brine container.

3. The desalination system of claim 1, further comprising a mineral/chemical pack in fluid communication with an outlet of the pump, the mineral/chemical pack containing water soluble chemicals that are diluted in the portion of the filtered water provided by the pump in a predefined concentration.

4. The desalination system of claim 1, further comprising a manifold connected to the outlet of the pump, and multiple bladders, each of the multiple bladders being selectively fluidly connectable with the outlet of the pump to receive the portion of the filtered water provided by the pump.

5. The desalination system of claim 1, wherein the ballast system further includes a bladder that is fluidly connected with an outlet of the pump, which bladder is connected to the vessel structure, and which, when inflated with the portion of the filtered water drawn from the water tank by the pump, provides a buoyant force to the vessel structure.

6. A method for desalinating water, comprising:
moving a vessel along a surface of a body of water to a desired location, the vessel containing a reverse osmosis system;
allowing the vessel to sink below the surface to a depth where sufficient pressure is present to operate the reverse osmosis system;
operating the reverse osmosis system to filter water drawn from around the vessel;
collecting filtered water in a water tank;
connecting the water tank with the surface of the body of water with a snorkel;
drawing water from the water tank;
collecting filtered water from the water tank in a bladder, which bladder is submerged below the surface of the body of water and inflated by the filtered water; and
controlling the depth of the vessel based at least in part on a buoyant force provided by the bladder when the bladder is inflated by the filtered water.

7. A method for lifting an object from a seafloor, comprising:
moving a vessel along a surface of a body of water to a desired location above the object, the vessel containing a reverse osmosis system;
allowing the vessel to sink below the surface to a depth where sufficient pressure is present to operate the reverse osmosis system;
connecting the vessel with the object on the seafloor;
operating the reverse osmosis system to filter water drawn from around the vessel;
collecting filtered water in an inflatable bladder that is connected with the vessel;
inflating the bladder with filtered water, the inflated bladder applying a positive buoyant force on the vessel when the filtered water has a lower density than the water drawn from around the vessel; and
using the positive buoyant force to lift the vessel and the object from the seafloor towards the surface of the body of water.

8. A desalination system that is deployable in a body of water having a surface and a seafloor, the desalination system comprising:
a vessel structure that is capable of travel in water, the vessel structure defining an internal space;
a reverse osmosis system disposed generally within the internal space of the vessel structure, the reverse osmosis system having an inlet and an outlet;
a tank connected to the outlet of the reverse osmosis system, the tank configured to receive filtered water from the reverse osmosis system;
a positioning system for controlling the travel of the vessel structure;
a ballast system configured to control buoyancy of the vessel structure;
a controller operably associated with the positioning system and the ballast system, the controller selectively controlling a position of the vessel below the surface of the body of water;
a pump connected to the tank and associated with the controller, the pump operable to selectively draw filtered water from the tank; and
a bladder fluidly connected to an outlet of the pump, wherein the bladder collects and stores filtered water drawn by the pump from the tank.

9. The desalination system of claim 8, further comprising an anchor attached by a tether to the vessel structure for anchoring the vessel structure to the seabed when the vessel structure is submerged below the surface of the body of water, and in which the bladder, when filled with filtered water, provides a buoyant force to locate the vessel structure a distance above the seafloor defined by the tether.

* * * * *